April 12, 1938.  W. A. MORTON  2,113,963
GLASS FEEDING APPARATUS AND METHOD
Original Filed April 25, 1928   2 Sheets-Sheet 1
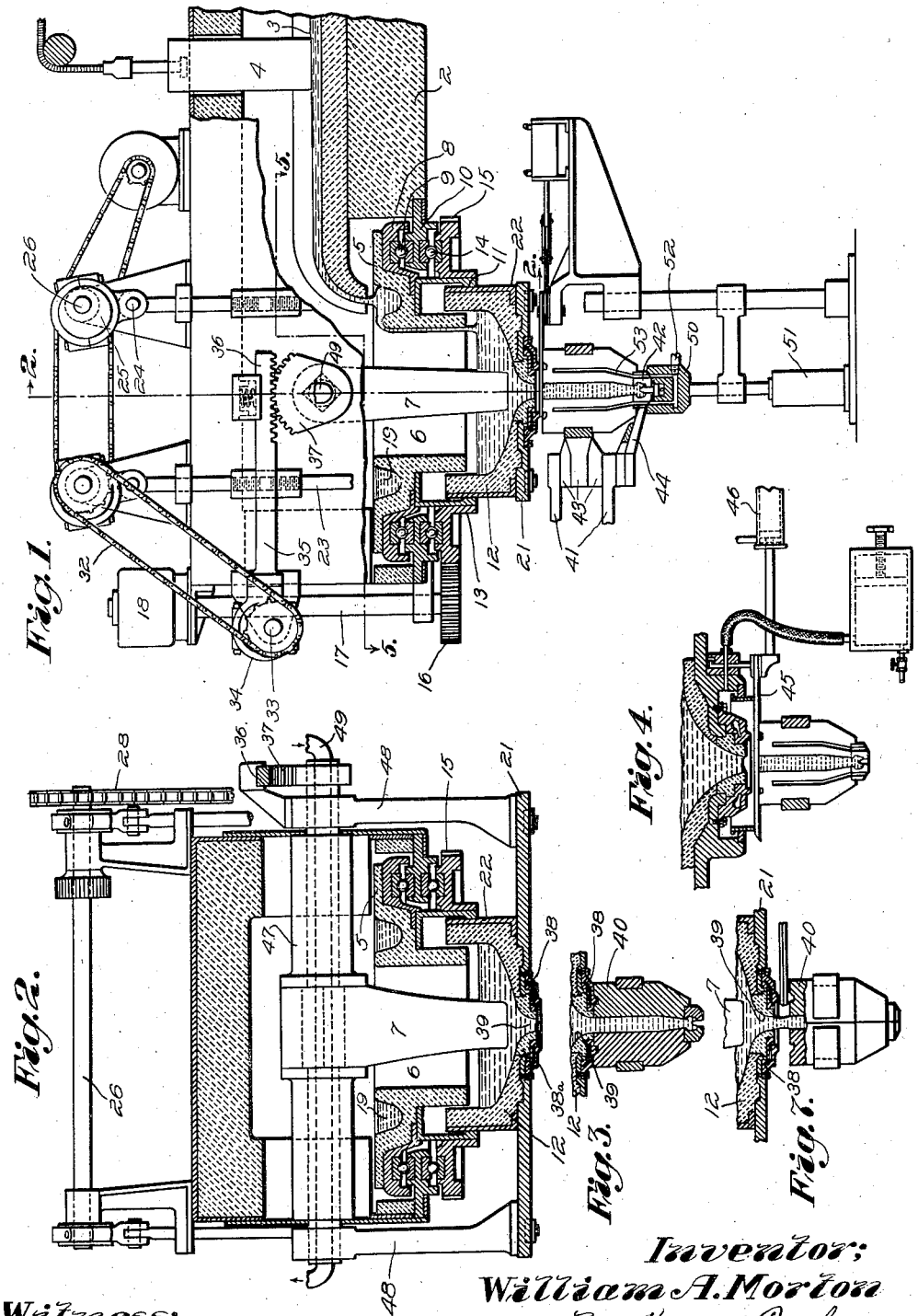
Witness:
W. B. Thayer.
Inventor:
William A. Morton
by Brown + Parham
Attorneys April 12, 1938. W. A. MORTON 2,113,963
GLASS FEEDING APPARATUS AND METHOD
Original Filed April 25, 1928 2 Sheets-Sheet 2
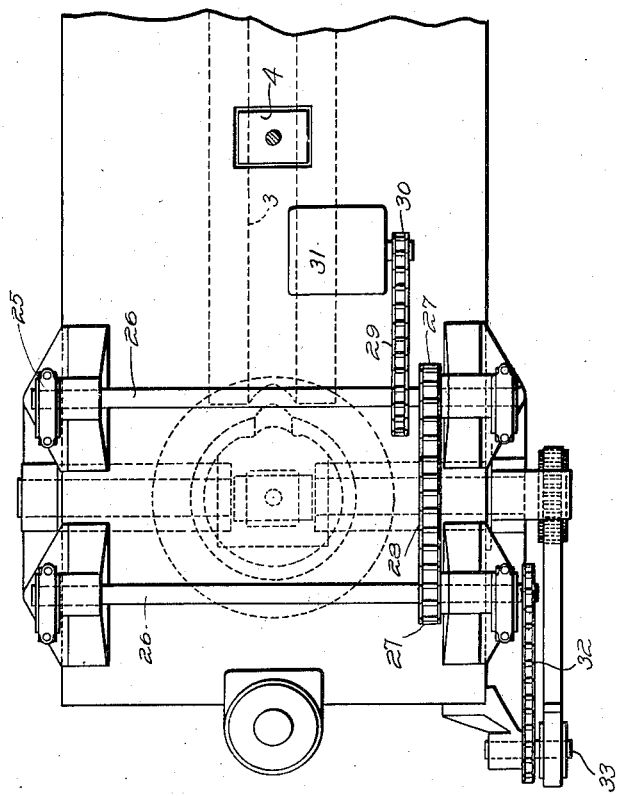
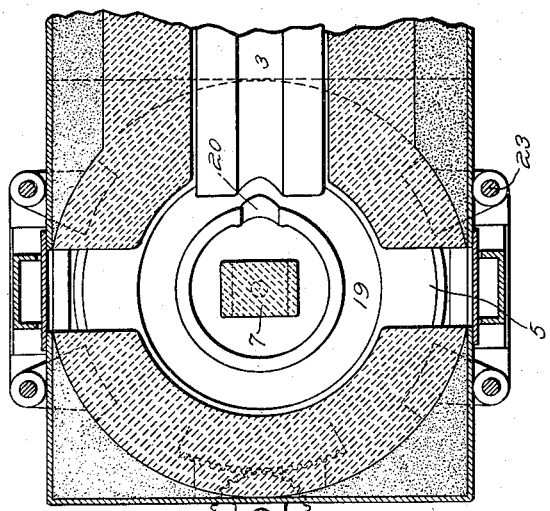
Inventor;
William A. Morton
by Brown+Durham
Attorneys
Witness;
W. B. Thayer.

Patented Apr. 12, 1938

2,113,963

UNITED STATES PATENT OFFICE 2,113,963

GLASS FEEDING APPARATUS AND METHOD

William A. Morton, Pittsburgh, Pa., assignor to Hartford-Empire Company, Hartford, Conn. a corporation of Delaware Refiled for abandoned application Serial No. 272,755, April 25, 1928. This application May 24, 1933, Serial No. 672,533

18 Claims. (Cl. 49—55)

This application is filed to replace my prior application for Glass-feeding apparatus, filed April 25, 1928, Serial No. 272,755, allowed November 19, 1931, and subsequently forfeited.

This invention refers to an improved apparatus for and a novel method of delivering charges of molten glass to a forming machine or mold, whereby the molten glass is maintained in a more uniformly heated condition for forming, provision being made for supplying measured charges to a mold, without vertical movement thereof, to position it to receive its charge.

These objects are accomplished by means of a vertically movable delivery basin, adapted to be lowered into contact with or close to but spaced from the fold, and to receive a maintained pool of glass from a main source, as a tank, through an intervening rotating supply vessel adapted to deliver fresh glass continuously and annularly within the delivery basin.

The invention also involves means for feeding the glass therefrom to the mold, effecting severance of the supply stream, temporary retraction of the flow, together with means for moving the various parts to accomplish the several objects and operations involved, as shall be more fully hereinafter described.

The invention in its broader aspects contemplates the utilization of improved means for supplying the outlet orifice with glass of uniform temperature and viscosity, avoiding troughs, chutes and other undesirable features tending to chill the glass and reduce its quality in the article to be molded.

The invention is illustrated in the accompanying drawings, in which

Figure 1 is a central vertical sectional view, partly in elevation, showing a practical embodiment of the invention.

Fig. 2 is a transverse vertical section on the line 2—2 of Fig. 1.

Fig. 3 is a vertical sectional detail view, showing the blank mold in communication with the delivery bottom of the supply basin;

Fig. 4 is a similar view, showing the basin retracted and the severing knife blade inserted.

Fig. 5 is a horizontal sectional view of the line 5—5 of Fig. 1.

Fig. 6 is a plan view of Fig. 1, and

Fig. 7 is a view similar to Fig 3 but showing the mold and the delivery bottom of the supply basin spaced slightly apart when the mold is being charged with glass from the basin.

Referring to the drawings, 2 represents the forehearth extension of a glass tank or the like, from which, through channel or trough 3, molten glass is supplied under control of a regulating dam or gate 4 to the distributing ring 5. Said ring is composed of suitable refractory material, and is provided with a hollow center 6 for clearance of the impeller 7. Ring 5 is provided with an annular supporting base 8 having an under trackway for a series of balls or rollers 9 and running in an annular trackway 10 carried at the under side of the forehearth extension 2.

Base 8 is provided with a downwardly extending shell 11 adapted to provide a circular engaging cylinder for the vertically movable basin 12, into which the molten glass is distributed by the annularly rotating ring 5. Shell 11 is provided with a lower casing 13, also preferably having a series of rolling bearings 14 between it and frame 10. Shell 11 is provided with an annular rack 15 for rotation by pinion 16 of shaft 17, transmitting power from a motor 18 or other suitable source, for rotation of the ring 5 at the desired speed. The ring 5 thus is mounted for easy rotary movement but at the same time will be adequately stayed against lateral or tilting movements.

Ring 5 is provided with an upper annular trough 19 into which glass is delivered from the inwardly coming stream 3. Glass is discharged downwardly into basin 12 through an outlet gap or spout at the inner periphery of the trough 19. By such construction, as ring 5 is rotated, the stream of glass will be continuously fed from the outlet of the trough 19 downwardly into the basin 12. The glass in the latter will be continuously augmented during operation with glass delivered thereto in a stream that moves in a circle adjacent to the inner periphery of the basin, thus assuring glass of uniform temperature and condition in the basin.

Basin 12 is supported upon a base plate 21 extending across underneath the machine. A cylindrical casing 22 for basin 12 is mounted on this plate. Base plate 21 is supported for vertical reciprocation by means of connecting rods 23, arranged in pairs at opposite sides of the machine and connected at 24 with actuating eccentrics 25 of cross shafts 26. Said shafts are actuated through belt drive gearing 27—28 and similar drive gearing 29—30 from motor 31. A belt drive 32 transmits power from one of the shafts 26 through to tube shaft 33 having the actuating eccentric 34 for reciprocating a pitman 35 for swinging the impeller 7 backwardly and forwardly through rack and pinion connections 36—37.

The basin 12 is provided at the center of its bottom with an outlet 39. The outlet 39 may comprise an integral tubular portion of the basin bottom, arranged to depend through an aperture in the base plate 21 or, as shown, may include a separately formed outlet ring held by a holding ring structure 38 in an apertured portion of the plate 21 so as to form in effect a continuation of the walls of a central opening in the basin bottom. The lower portion of the ring structure 38 may be adapted for sealing engagement with the upper surface of the blank mold 40 if the basin be lowered until in contact with the mold, as shown in Fig. 3. Instead of bringing the basin and the mold into actual contact, the basin may be lowered sufficiently to assure sealing of the upper end of the mold cavity by the glass passing thereinto, as shown in Fig. 7, without actual contact of the basin with the mold, substantially as disclosed in the application of Karl E. Peiler, Serial No. 460,353, filed June 11, 1930, now Patent No. 1,914,156, granted June 13, 1933 owned by the owner of the present application.

Said mold and its neck mold 42 may be supported, opened and closed at the proper times, and moved to and from the glass receiving station below the outlet 39 by any suitable known means, as by suitable structure on a glassware forming machine, including supporting arms 41 and hinged carriers 43 and 44 for the sections of the mold 40 and its neck mold 42.

A transversely movable shear blade 45 may be thrust inwardly across the supply stream of glass for the severance thereof at the upper end of the mold, under impulse of the fluid-actuated plunger of cylinder 46. The construction of the mold contacting mechanism, shear, etc. may be generally similar to that more fully illustrated and described in a patent to Fritz Eckert, No. 2,026,225, granted December 31, 1935.

In lieu of such construction, a pair of cooperating shear blades, operated in any suitable known manner, may be closed at the proper time to sever the glass between the outlet 39 and the upper end of the mold cavity at a plane spaced sufficiently from each to be out of smearing relation therewith.

The impeller 7 extends downwardly into the middle portion of basin 12 closely adjacent the outlet opening 39, and is carried upon a transverse supporting yoke 47 above the ring 6, upon a water-cooled trunnion mounted in standards 48 extending upwardly from base plate 21. The trunnion is cooled by circulation of water or air introduced by pipe 49 at one end and passing outwardly from the other. Instead of the use of the impeller 7, control of discharge of glass from the outlet 39 may be effected by the use of a suitably timed and operated reciprocating plunger having its lower end depending into the glass in substantial alignment with the outlet or by the use of suitable pneumatic glass discharge controlling mechanism, all of which are now well known in the art.

Mold 40 may operate in connection with a vertically actuated suction head 50, raised and lowered by a plunger within the fluid pressure casing 51, Fig. 1. Head 50 is provided with a suction connection 52 operating to effect a partial vacuum between the mold and the lower face of the discharge bottom of the basin 21, through exhaust conduits 53. The exhaust conduits 53 may be the usual leak grooves of a mold of a well-known type of construction and suction may be effected in the mold cavity at the proper time to aid in filling such cavity. Neck mold 42 may provide a portion of such exhaust circulation.

When the mold has been charged with the amount of glass desired, the basin may be raised, the glass in the mold may be severed from the glass supply, and the charged mold then may be removed and an empty mold brought to the charge-receiving station. The operations of the impeller 7 or of other glass discharge control mechanism that may be used in lieu thereof, the vertical movements of the basin, the application of suction within the mold cavity (if employed), and the operations of the severing mechanism may be regulably controlled and timed with relation to one another and to the movements of the molds to and from the charge receiving station to provide for relatively rapid and effective charging of successive molds with charges suitable for fabrication into satisfactory articles of glassware.

The construction and operation of the invention will be readily understood from the foregoing description. During continuous feeding of the glass and rotation of the hollow ring 5, the basin 12 will be continuously supplied with fresh glass of a general average of consistency and viscosity throughout, the impeller 7 moving the necessary portion of glass over toward the outlet opening for each mold charging operation. The forehearth structure may be provided with any suitable known means for regulating and controlling the temperature of the glass passing along the channel 3 to the ring 5, in the ring 5, flowing from the ring 5 into the basin 12, and while in the basin 12 and issuing from the outlet of the latter to effect charging of the molds. The various movements, flow of glass, timing, etc., are controlled and adjusted in synchronism with the operation of the mold-carrying machine, for economy of time and greatest production of the molded blanks.

I claim:

1. In a glass feeding device, the combination of a container for molten glass having an outlet opening, an auxiliary rotatable member for distributing glass from a single position thereon to a path around said outlet, and means for supplying the glass to said auxiliary member in a path entirely around the same.

2. The method of feeding molten glass which comprises, providing a supply body of molten glass over a final discharge outlet, and augmenting said supply body of glass by a localized stream of glass from above having its place of juncture with the supply body located entirely at but one side of the axial line of the outlet at any given time, said place of juncture being shifted angularly in a circular path extending completely around the axial line of said outlet.

3. In combination with an upper conduit for supplying molten glass, a rotatably mounted receiver having an annular receiving channel with a localized overflow outlet, said annular receiving channel being so located as to receive molten glass from said upper conduit, and a lower receiving and delivery vessel located in position to receive glass from said overflow outlet.

4. In combination with an upper conduit for supplying molten glass, a rotatably mounted open center receiver having an upper annular receiving channel with a localized overflow outlet, said annular receiving channel being so located as to receive molten glass from said upper conduit, and a lower receiving vessel positioned to receive around its center a stream of glass from said overflow outlet.

5. In combination with an upper conduit for supplying molten glass, a rotatably mounted open center receiver having an upper annular receiving channel with a localized overflow outlet, said annular receiving channel being so located as to receive molten glass from said upper conduit, means for rotating said rotatably mounted receiver, and a lower receiving vessel having a central outlet opening and positioned to receive around its outlet opening a stream of glass from the receiver as the receiver is rotated.

6. In combination with an upper conduit for supplying molten glass, a rotatably mounted receiver having an annular receiving channel with a localized outlet, said annular receiving channel being so located as to receive molten glass from said upper conduit, means for rotating said rotatably mounted receiver, and a lower vertically reciprocable receiving and delivery vessel having a central delivery opening located centrally of the path of movement of said localized outlet when said rotatably mounted receiver is rotated about its own axis.

7. In combination with the forehearth of a glass furnace having a supply channel and means controlling flow therethrough, an annular trackway, a hollow center feeding ring mounted thereon and having an annular channel extending below the delivery end of the supply channel and a localized overflow groove leading downwardly within the feeding ring, said feeding ring being positioned to receive in its annular channel glass from said supply channel, and a lower delivery vessel having a central delivery outlet opening and positioned to receive glass from said feeding ring.

8. In combination with the forehearth of a glass furnace having a supply channel and means controlling flow therethrough, an annular trackway, a hollow center feeding ring mounted thereon and having an annular channel extending below the delivery end of the supply channel and a localized overflow groove leading downwardly within the feeding ring, said feeding ring being positioned to receive in its annular channel glass from said supply channel, a lower delivery vessel having a central delivery outlet opening and positioned to receive glass from said feeding ring, and a laterally movable impeller extending through the feeding ring towards the opening of the delivery vessel.

9. In combination with the forehearth of a glass furnace having a supply channel and means controlling flow therethrough, an annular trackway, a hollow center feeding ring rotatably mounted thereon and having an annular channel extending below the delivery end of the supply channel and a localized overflow groove leading downwardly within the feeding ring, said feeding ring being positioned to receive in its annular channel glass from said supply channel, a lower delivery vessel having a central delivery outlet opening and positioned to receive glass from said feeding ring, and means for rotating the feeding ring.

10. In combination with the forehearth of a glass furnace having a supply channel and means controlling flow therethrough, an annular trackway, a hollow center feeding ring mounted thereon and having an annular channel extending below the delivery end of the supply channel and a localized overflow groove leading downwardly within the feeding ring, said feeding ring being positioned to receive in its annular channel glass from said supply channel, a vertically reciprocable lower delivery vessel having a central delivery outlet opening and positioned to receive glass from said feeding ring, and means for vertically reciprocating the delivery vessel.

11. In combination with the forehearth of a glass furnace having a supply channel and means controlling flow therethrough, an annular trackway, a hollow center feeding ring mounted thereon and having an annular channel extending below the delivery end of the supply channel and a localized overflow groove leading downwardly within the feeding ring, said feeding ring being positioned to receive in its annular channel glass from said supply channel; a vertically reciprocable lower delivery vessel having a central delivery outlet opening and positioned to receive glass from said feeding ring, a laterally movable impeller extending through the feeding ring towards and adjacent to the opening of the delivery vessel, and means for vertically reciprocating the delivery vessel and laterally moving the impeller in synchronism.

12. In combination with the forehearth of a glass furnace having a supply channel and means controlling flow therethrough, an annular trackway, a hollow center feeding ring rotatably mounted thereon and having an annular channel extending below the delivery end of the supply channel and a localized overflow groove leading downwardly within the feeding ring, said feeding ring being positioned to receive in its annular channel glass from said supply channel, a vertically reciprocable lower delivery vessel having a central delivery outlet opening and positioned to receive glass from said feeding ring, a laterally movable impeller extending through the feeding ring towards and adjacent to the opening of the delivery vessel, means for vertically reciprocating the delivery vessel and laterally moving the impeller in synchronism, and means for continuously rotating the feeding ring.

13. In combination with a supply channel for delivering molten glass, a lower vertically reciprocating circular supply vessel having a central outlet opening, a rotatable hollow center feeding ring between the supply channel and said vessel in telescoping engagement with said vessel and having an upper annular receiving channel and a localized overflow groove movable angularly around the axial line of said central outlet opening as said feeding ring is rotated for delivering glass around the center of and within the supply vessel, and means effecting feeding flow through the central outlet opening of the supply vessel.

14. In combination with a supply channel for delivering molten glass, a lower vertically reciprocating circular supply vessel having a central outlet opening, a rotatable hollow center feeding ring between the supply channel and said vessel in telescoping engagement with said vessel and having an upper annular receiving channel and a localized overflow groove movable angularly about the axial line of said central outlet opening as said feeding ring is rotated for delivering glass around the center of and within the supply vessel, and means effecting stoppage and retraction of flow through the central outlet opening of the supply vessel.

15. In a glass feeding device, the combination of a container for molten glass having an outlet opening, a rotary auxiliary container to distribute the glass around said outlet opening and having means to effect a discharge of glass over an edge thereof in a uniform localized solid stream that is located entirely at one side of the axial line of said outlet opening.

16. In a glass feeding device, the combination of a container for molten glass having an outlet opening, a rotary auxiliary glass-distributing member comprising a ring concentrically arranged with respect to said container, an overflow spout on said auxiliary member, and means for rotating the auxiliary member to distribute glass from said spout around said outlet opening.

17. In a glass feeding device, the combination of a container for molten glass having an outlet opening in the bottom thereof, a source of glass supply above the container and an intervening rotating member having a channel positioned to receive glass from said source of supply and having an outlet for distributing glass to said container in a single localized solid stream at a place that is located laterally of and is shifted around the outlet opening of said container as said intervening member rotates, the channel of said rotating member supporting the glass to be distributed independently of the glass in said container.

18. Means for feeding thermally conditioned molten glass mold charges to a forming machine comprising, in combination, a molten glass container having a bottom discharge outlet, a rotary annular glass distributing trough having an overflow spout for delivering glass to said container, a source of fresh glass supply having a fixed discharge channel positioned to deliver glass to said distributing trough, and means for rotating said distributing trough to move said spout successively toward and away from said channel to distribute fresh glass to said container in a path extending around its bottom discharge outlet.

WILLIAM A. MORTON.